US010508035B2

(12) United States Patent
Fukunaga et al.

(10) Patent No.: US 10,508,035 B2
(45) Date of Patent: Dec. 17, 2019

(54) ALUMINUM NITRIDE POWDERS

(71) Applicant: TOKUYAMA CORPORATION, Shunan-shi, Yamaguchi (JP)

(72) Inventors: Yutaka Fukunaga, Shunan (JP); Yukihiro Kanechika, Shunan (JP); Meng Wang, Shunan (JP); Ken Sugawara, Shunan (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 776 days.

(21) Appl. No.: 14/759,998

(22) PCT Filed: Feb. 6, 2014

(86) PCT No.: PCT/JP2014/053389
§ 371 (c)(1),
(2) Date: Jul. 9, 2015

(87) PCT Pub. No.: WO2014/123247
PCT Pub. Date: Aug. 14, 2014

(65) Prior Publication Data
US 2015/0353355 A1  Dec. 10, 2015

(30) Foreign Application Priority Data

Feb. 8, 2013  (JP) ................... 2013-023829
Jun. 4, 2013  (JP) ................... 2013-118115
(Continued)

(51) Int. Cl.
*C04B 35/581* (2006.01)
*C01B 21/072* (2006.01)
(Continued)

(52) U.S. Cl.
CPC .......... *C01B 21/072* (2013.01); *C04B 35/581* (2013.01); *C09K 5/14* (2013.01); *Y10T 428/2982* (2015.01)

(58) Field of Classification Search
None
See application file for complete search history.

(56) References Cited

U.S. PATENT DOCUMENTS 4,618,592 A * 10/1986 Kuramoto .......... C01B 21/0726
264/676
5,049,367 A * 9/1991 Nakano .............. C01B 21/0726
423/412
(Continued)

FOREIGN PATENT DOCUMENTS

EP  0 431 927 A1  6/1991
EP  2 530 049 A1  12/2012
(Continued)

OTHER PUBLICATIONS

Juang, R.-C., Lee, C.-J., Chen, C.-C. "Combustion synthesis of hexagonal aluminum nitride powders under low nitrogen pressure" Materials Science and Engineering A357 (2003). pp. 219-227. (Year: 2003).*
(Continued)

*Primary Examiner* — Ronak C Patel
*Assistant Examiner* — Thomas A Mangohig
(74) *Attorney, Agent, or Firm* — Birch, Stewart, Kolasch & Birch, LLP

(57) ABSTRACT

Aluminum nitride crystal particles, aluminum nitride powders containing the same, production processes for both of them, an organic polymer composition comprising the aluminum nitride crystal particles and a sintered body.
Each of the aluminum nitride crystal particles has a flat octahedral shape in a direction where hexagonal faces are
(Continued)

opposed to each other, which is composed of two opposed hexagonal faces and 6 rectangular faces, in which
the average distance "D" between two opposed corners of each of the hexagonal faces is 3 to 110 μm, the length "L" of the short side of each of the rectangular faces is 2 to 45 μm, and L/D is 0.05 to 0.8; each of the hexagonal faces and each of the rectangular faces cross each other to form a curve without forming a single ridge; and the true destiny is 3.20 to 3.26 g/cm$^3$.

20 Claims, 2 Drawing Sheets

(30) Foreign Application Priority Data

Jun. 4, 2013 (JP) .................................. 2013-118223
Sep. 27, 2013 (JP) .................................. 2013-201810

(51) Int. Cl.
*C09K 5/14* (2006.01)
*C08K 3/28* (2006.01)

(56) References Cited

U.S. PATENT DOCUMENTS

| | | | |
|---|---|---|---|
| 5,154,907 A | 10/1992 | Kim | |
| 5,468,697 A | 11/1995 | Yamaguchi et al. | |
| 6,565,935 B1 * | 5/2003 | Lohnes | C04B 26/14 |
| | | | 428/34.1 |
| 2010/0255304 A1 | 10/2010 | Amano et al. | |
| 2013/0164534 A1 | 6/2013 | Muneoka et al. | |
| 2013/0244036 A1 | 9/2013 | Muneoka et al. | |

FOREIGN PATENT DOCUMENTS

| | | |
|---|---|---|
| JP | 3-295853 A | 12/1991 |
| JP | 6-191807 A | 7/1994 |
| JP | 6-321511 A | 11/1994 |
| JP | 2001-2474 A | 1/2001 |
| JP | 2003-335600 A | 11/2003 |
| TW | 201231384 A1 | 8/2012 |
| WO | WO 95/19317 | 7/1995 |
| WO | WO 2009/066663 A1 | 5/2009 |
| WO | WO 2012/029868 A1 | 3/2012 |

OTHER PUBLICATIONS

International Search Report, issued in PCT/JP2014/053389, dated May 27, 2014.
Office Action issued in corresponding Taiwanese Application No. 103104096 dated Nov. 26, 2016 (in Japanese language).
International Preliminary Report on Patentability and Written Opinion of the International Searching Authority (Forms PCT/IB/338, PCT/IB/373 and PCT/ISA/237) for International Application No. PCT/JP2014/053389, dated Aug. 20, 2015.
European Patent Office Search Report dated Aug. 24, 2016 for EP Patent Application No. 14749001.5.
European Patent Office Search Report dated Dec. 7, 2018 for EP Patent Application No. 14749001.5.
Kahne et al., J Trans Chem Soc., "Micron-particulate crystalline hexagonal aluminium nitride: a novel, efficient and versatile heterogeneous catalyst for the synthesis of some heterocyclic compounds", vol. 10, pp. 243-249, 2012 (Abstract).
Komeya et al., Journal of the Ceramic Society of Japan, "Synthesis of AlN Powder by Carbothermal Reduction-Nitridation Method", vol. 101, No. 4, pp. 366-371, 1993 (Abstract).

* cited by examiner

ALUMINUM NITRIDE POWDERS

TECHNICAL FIELD

The present invention relates to aluminum nitride crystal particles, aluminum nitride powders containing the same, production processes for both of them, an organic polymer composition comprising the aluminum nitride crystal particles, and a sintered body

BACKGROUND ART

Since aluminum nitride has high heat conductivity and excellent electric insulating properties, it is expected to be used as an insulating/heat-radiating filler for use in highly heat conductive substrates and heat-radiating parts. A heat-radiating filler improves heat conductivity when it is dispersed in a matrix such as a resin or rubber and is used in the fields of heat-radiating sheet- or film-like spacers, heat-radiating greases and heat-radiating adhesives.

To improve the heat conductivity of a heat-radiating material, fillers must be in contact with each other in a matrix to forma heat conducting path. Therefore, in general, when a filler is used, a large-sized filler and a small-sized filler are used in combination to optimize the particle size so as to increase the filling rate.

By the way, for the production of aluminum nitride powders, there are known a reduction nitriding process in which alumina and carbon are heated in a nitrogen atmosphere, a direct nitriding process in which metal aluminum and nitrogen are directly reacted with each other, and a vapor phase process in which an alkyl aluminum and ammonia are reacted with each other and heated.

However, aluminum nitride powders obtained by the above reduction nitriding process and the above vapor phase process have a particle size of submicron order, and it is difficult to obtain aluminum nitride particles having a relatively large size of several to several tens of micrometers which are required as the above large-sized filler.

Meanwhile, since grinding and classification are carried out in the direct nitriding process, the control of particle size is relatively easy and aluminum nitride particles as large as several to several tens of micrometers can be obtained. However, a grinding step is essential and therefore, the obtained aluminum nitride powder particles are angular in shape and not uniform in size, whereby there is room for the improvement of filling properties into a resin and the performance stability of a heat conductive resin obtained by adding the aluminum nitride powders.

Besides the above processes, there is a process for obtaining aluminum nitride powders having a large particle size and a desired average particle diameter, in which a sintering aid, a binder and a solvent are added to aluminum nitride powders, the resulting mixture is spray dried, and the obtained spherical granulated powders are sintered (JP-A 3-295853). However, since the obtained sintered body of the granulated powders has a polycrystal structure that particles are bonded together by sintering, there is room for the improvement of heat conductivity, it is difficult to obtain aluminum nitride particles which are uniform in shape, and the process has problems with filling properties into a resin and the performance stability of a heat conductive resin obtained by adding the aluminum nitride powders. Since the particles filled into a resin are spherical, a heat conducting path is hardly formed. Further, since the aluminum nitride powders are used as a raw material, the raw material is expensive, thereby causing an economic problem.

To obtain a single crystal having a large size, there is a process for obtaining columnar aluminum nitride crystal particles by subliming aluminum nitride to grow columnar aluminum nitride crystals on a seed crystal and cutting them (WO2009/066663). Since aluminum nitride crystal particles obtained by this process are single crystals, they have higher heat conductivity than a polycrystal and are uniform in particle shape. However, the obtained aluminum nitride crystal particles are columnar with an angular ridge and when they are used as a filler, kneading properties degrade. In addition, since aluminum nitride is used as a raw material, the cost becomes high.

As described at the beginning, along with a rise in the power density of a semiconductor device, higher heat radiation properties are now required for materials used to mount a device. The materials include materials called "thermal interface materials" whose consumption is increasing rapidly. The term "thermal interface materials" means materials for alleviating the heat resistance of a path from which heat generated from a semiconductor device is released to a heat sink or a housing and used in various forms such as a sheet, gel and grease.

In general, the thermal interface material is a composite material prepared by filling a heat conductive filler into an organic polymer component, and silica or alumina is often used as the filler. However, the heat conductivity of silica is about 1 W/m·K, the heat conductivity of alumina is about 36 W/m·K, and even a composite material comprising alumina has a heat conductivity of 1 to 5 W/m·K. Therefore, a composite material having higher heat conductivity is desired.

Therefore, there is now proposed to fill aluminum nitride having higher heat conductivity than silica and alumina into an organic polymer component.

When heat conductivity is provided to an organic polymer composition by filling aluminum nitride into an organic polymer, a heat conducting path must be ensured by producing spherical aluminum nitride particles which are easily filled well and filling them in a high concentration in order to increase the contact area between aluminum nitride particles. Therefore, in general, not less than 60 vol % of aluminum nitride is contained in the organic polymer composition. However, when a large amount of aluminum nitride is contained in the organic polymer composition, the material cost rises and moldability degrades due to an increase in viscosity.

Meanwhile, there are known aluminum nitride whiskers having a fiber diameter of not more than 1 μm and a length of 5 to 500 μm (refer to Electrochemistry, vol. 10, p. 743, 1972 and the bulletin of scientific papers of the Ceramic Society of Japan, vol. 97, p. 864, 1989). However, since these whiskers are asbestos-like, they have low work efficiency and their influence on a human body is concerned.

These whiskers are produced by a sublimation-recrystallization method (refer to Electrochemistry, vol. 10, p. 743, 1972) or a vapor-phase synthesis method (refer to the bulletin of scientific papers of the Ceramic Society of Japan, vol. 97, p. 874, 1989). The former method is not suitable for industrialization since the operation temperature is very high at 1,800 to 2,000° C., and the latter method is also unsuitable for mass-production.

Further, an aluminum nitride sintered body has excellent properties such as high heat conductivity, high plasma resistance and electric insulating properties. Therefore, it is used in various fields such as industrial robots, electric railroad trains, automobiles and LED lighting as an insulating/heat-radiating substrate making use of high heat conductivity and electric insulating properties.

An aluminum nitride sintered body having high heat conductivity in particular is often used as a substrate for mounting a high-output type semiconductor device such as a power transistor generating a large amount of heat and a laser element.

When this aluminum nitride sintered body is used as a mounting substrate or circuit substrate, the formation of a metal layer constituting an element mounting part or a circuit part on the surface is essential. As the method of forming the above metal layer, a bonded body is constructed by bonding the aluminum nitride sintered body to a metal substrate by means of a brazing material.

However, to construct a bonded body with the above metal substrate, the aluminum nitride sintered body is not satisfactory in terms of mechanical properties, especially fracture toughness and Vickers hardness all of which are desirably further improved. That is, when fracture toughness and Vickers hardness are low, the aluminum nitride sintered body may be broken by stress or heat produced at the time of mounting a semiconductor device on a metal circuit layer formed on the surface of the aluminum nitride sintered body, or the aluminum nitride sintered body near the junction of the above metal circuit layer may be cracked by a plurality of heat cycles due to the operation of the semiconductor device, thereby reducing heat cycle resistance and reliability.

A ceramic substrate for power modules in particular is now frequently used under more severe heat cycles than before and accordingly, the improvement of heat impact resistance as well as fracture toughness and Vickers hardness is more strongly desired.

Heretofore, to cope with the above problems, there is proposed a sintered body comprising large-sized crystal particles and small-sized crystal particles as crystal particles constituting an aluminum nitride sintered body (refer to JP-A 2001-2474).

Although the above aluminum nitride sintered body is effective for the above problems to a certain extent, further improvement has been desired.

DISCLOSURE OF THE INVENTION

Problem to be Solved by the Invention

It is an object of the present invention to provide novel aluminum nitride crystal particles having a relatively large particle size and a unique shape.

It is another object of the present invention to provide aluminum nitride powders which contain the above aluminum nitride crystal particles, exhibit high kneading properties when they are added to a resin as a heat conductive filler and provides excellent heat conductivity to the obtained resin composition.

It is another object of the present invention to provide a process for producing the above aluminum nitride crystal particles.

It is a further object of the present invention to provide an organic polymer composition comprising the above aluminum nitride crystal particles.

It is a still further object of the present invention to provide an organic polymer composition having heat conductivity and moldability by filling the above aluminum nitride crystal as a filler into an organic polymer component.

It is a still further object of the present invention to provide a sintered body of the above aluminum nitride crystal particles and a production process therefor.

It is a still further object of the present invention to provide an aluminum nitride sintered body having high heat conductivity and excellent mechanical strength such as fracture toughness and Vickers hardness and a production process therefor.

Other objects and advantages of the present invention will become apparent from the following description.

Means for Solving the Problem

According to the present invention, firstly, the above objects and advantages of the present invention are attained by aluminum nitride crystal particles (may be referred to as "specific AlN crystal particles" hereinafter), each having a flat octahedral shape in a direction where hexagonal faces are opposed to each other, which is composed of two opposed hexagonal faces and six rectangular faces, wherein the average distance "D" between two opposed corners within each of the hexagonal faces is 3 to 110 µm, the length "L" of the short side of each of the rectangular faces is 2 to 45 µm, and L/D is 0.05 to 0.8; each of the hexagonal faces and each of the rectangular faces cross each other to form a curve without forming a single ridge; and the true density is 3.20 to 3.26 g/cm$^3$.

According to the present invention, secondly, the above objects and advantages of the present invention are attained by a process for producing the above aluminum nitride crystal particles, comprising the step of:

reduction nitriding alumina agglomerated particles having an average particle diameter of 5 to 100 µm which are agglomerates of alumina particles having an average particle diameter of 0.1 to 3 µm in the presence of a liquid-phase forming agent in a reaction atmosphere which satisfies the following concentration(s):

(1) a carbon monoxide gas concentration of 20 to 50 vol %, and/or (2) a nitrogen gas concentration of 10 to 80 vol %.

According to the present invention, thirdly, the above objects and advantages of the present invention are attained by an organic polymer composition comprising 100 to 600 parts by weight of the above aluminum nitride particles and 100 parts by weight of an organic polymer in which the aluminum nitride particles are dispersed.

According to the present invention, in the fourth place, the above objects and advantages of the present invention are attained by an aluminum nitride sintered body which is a sintered body of the above aluminum nitride crystal particles, wherein at least part of the hexagonal faces of each of the aluminum nitride crystal particles is oriented almost in the same direction as the flat plane of the sintered body, and the sintered body has a fracture toughness of not less than 5 MPa·m$^{1/2}$, a heat conductivity of 150 to 230 W/m·k and a Vickers hardness of 11 to 16 GPa.

According to the present invention, in the fifth place, the above objects and advantages of the present invention are attained by a process for producing the above sintered body, comprising the steps of:

forming a molded product by molding aluminum nitride powders containing 60 to 90 mass % of the above aluminum nitride crystal particles and 2 to 40 mass % of aluminum nitride particles having an average particle diameter of 0.5 to 3 µm to ensure that the hexagonal faces of each of the aluminum nitride crystal particles are oriented almost in the same direction as the flat surface of the obtained sintered body; and sintering the molded product.

BEST MODE FOR CARRYING OUT THE INVENTION

Aluminum Nitride Crystal Particle

The specific AlN crystal particle of the present invention has a flat octahedral shape composed of two hexagonal faces and six rectangular faces, and each of the hexagonal faces and each of the rectangular faces cross each other to form a curve without forming a single ridge. This shape can be confirmed from a photomicrograph having a magnification of 1,000.

Figure 4:
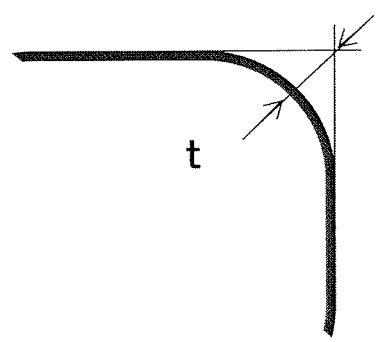
FIG. 4 is a conceptual diagram showing a method of measuring the degree of a curve where a hexagonal face and a rectangular face cross each other on a cross section in a direction perpendicular to the hexagonal face of the AlN crystal particle which is an aluminum nitride crystal particle.

As shown in FIG. 4, the above curve is preferably formed such that, assuming that the hexagonal face and the rectangular face cross each other to form a single ridge, the distance "t" between the single ridge and the above curve satisfies 0<t<0.1 μm. The distance "t" is defined as the length of a perpendicular line from the virtual ridge to the curve. The distance "t" can be obtained from a photomicrograph having a magnification of 1,000 of a cross section in a direction perpendicular to the hexagonal face of the specific AlN crystal particle.

As for the shape of the specific AlN crystal particle, the shapes of a missing part, a recessed part, a projection part and another adhered particle (see FIG. 1) actually observed on the hexagonal faces and the rectangular faces in a photomicrograph are ignored.

In the specific AlN crystal particle of the present invention, the distance "D" between two opposed corners of the hexagonal face (to be referred to as "long diameter D" hereinafter) is 3 to 110 μm, the length "L" of the short side of the rectangular face is 2 to 45 μm, and L/D (to be referred to as "aspect ratio" hereinafter) is 0.05 to 0.8, preferably 0.1 to 0.7.

Figure 1:
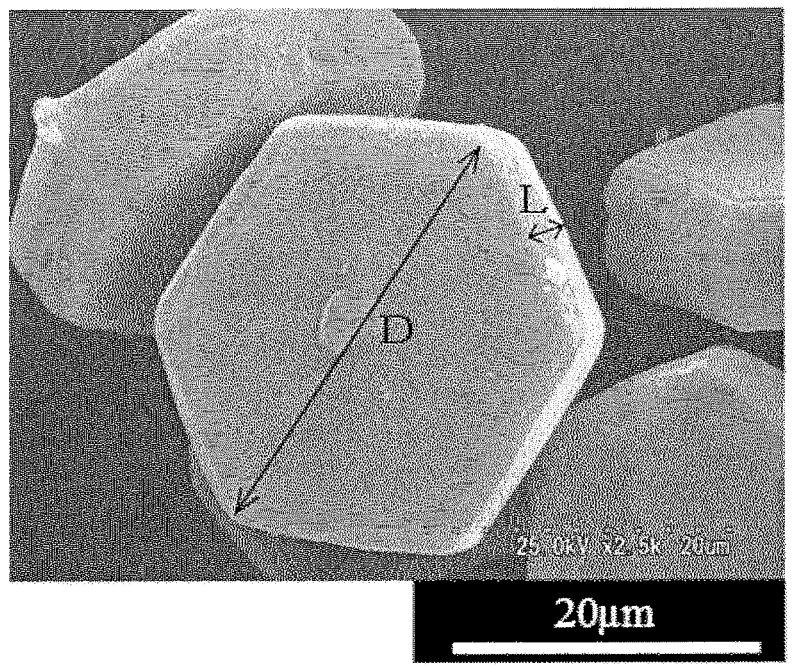
FIG. 1 is a photomicrograph showing the particle structure of aluminum nitride powders obtained in Example 2.

FIG. 1 is a photomicrograph showing an example of the specific AlN crystal particle of the present invention obtained by the process described in Example 2. As shown in FIG. 1, the shapes of the flat planes of the specific AlN crystal particle of the present invention are almost regular hexagonal, and the specific AlN crystal particle is an aluminum nitride single crystal or has properties close to those of the single crystal. The opposed flat planes are generally parallel to each other.

Further, the specific AlN crystal particle has no sharp corners at all ridge parts which are confirmed from a photomicrograph having a magnification of 1,000 of the cross section, i.e., ridge parts having round corners obtained by so-called "chamfering". The above round corners of the ridge parts are obtained by forming the specific AlN crystal particle by the production and particle growth of aluminum nitride by the reduction nitriding of an alumina agglomerate in accordance with the production process which will be described hereinafter. Therefore, this specific AlN crystal particle is clearly distinguished from a crystal particle having a sharp corner on the cut cross section obtained by a process in which an aluminum nitride single crystal is grown and cut. Since the specific AlN crystal particle of the present invention has ridge parts with round corners, it has high flowability as compared with a crystal particle having a sharp corner.

Further, the specific AlN crystal particle of the present invention has a feature that it has an L/D of less than 0.8 and large flat hexagonal faces. Thereby, a heat conducting path tends to be formed in the planar direction of the particle, and crystal particles contact each other on their hexagonal faces, thereby greatly increasing the contact area between particles as compared with a general spherical particle. Further, due to the above single crystal-like quality, even when a small amount of the AlN crystal particle is used, high heat conductivity can be provided to a resin molded product. The plate-like AlN crystal particle of the present invention has a high density of 3.20 to 3.26 g/cm$^3$.

The size indicated by the long diameter of the specific AlN crystal particle of the present invention can be adjusted by the size of an agglomerate of alumina fine powders in the production process which will be described hereinafter, and the specific AlN crystal particles of the present invention can have a sharp distribution as understood from FIG. 2 which shows the particle size distribution of aluminum nitride powers obtained in Example 2 or a wide distribution. However, when the specific AlN crystal particles are mixed with aluminum nitride crystal particles having a different particle diameter, for example, a smaller particle diameter to produce aluminum nitride powders, specific AlN crystal particles having a sharp distribution are preferred to facilitate the adjustment of the whole particle size distribution.

According to the present invention, there can be provided aluminum nitride powders containing the above specific AlN crystal particles of the present invention, i.e., aluminum nitride powders containing preferably at least 60 vol %, more preferably at least 70 vol %, much more preferably at least 80 vol %, particularly preferably at least 90 vol % of the specific AlN crystal particles.

Aluminum nitride particles except for the above specific AlN crystal particles are, for example, aluminum nitride particles containing aluminum nitride fine particles derived from alumina fine powders as a raw material as the main component in most cases.

In the application of the aluminum nitride powders of the present invention, as will be described hereinafter, they may be used in combination with known aluminum nitride powders, and the above aluminum nitride particles except for the specific AlN crystal particles may be used as part or all of the aluminum nitride powders.

Although the aluminum nitride particles except for the specific AlN crystal particles produced in the production process may exhibit the effect of the specific AlN crystal particles as they are according to purpose, they may reduce the effect of the specific AlN crystal particles or make the effect of the specific AlN crystal particles unstable when they are used in combination with other aluminum nitride powders in a certain application. Therefore, the content of the specific AlN crystal particles is preferably as high as possible.

Consequently, the aluminum nitride powders of the present invention contain preferably not less than 90 vol %, particularly preferably not less than 95 vol %, most preferably 100 vol % of the specific AlN crystal particles.

As a matter of course, the aluminum nitride powders of the present invention may be mixed with known aluminum nitride powders as required in their application, and aluminum nitride whose content of the specific AlN crystal particles has been adjusted to the above range in that application can contain the specific AlN crystal particles accurately and constitutes a composition which exhibits stable performance.

The aluminum nitride powders of the present invention containing the above specific AlN crystal particles have an average particle diameter of 3 to 110 μm, preferably 5 to 90 μm and a specific surface area of preferably 0.01 to 2 $m^2/g$, more preferably 0.05 to 2 $m^2/g$, particularly preferably 0.1 to 1 $m^2/g$.

<Production Process of Aluminum Nitride Crystal Particles>

The specific AlN crystal particles of the present invention are produced as aluminum nitride powders containing the same. Although the production process therefor is not particularly limited, as a typical production process, there is a process in which alumina agglomerated particles having an average particle diameter of 5 to 100 μm which are agglomerates of alumina particles having an average particle diameter of 0.1 to 3 μm are reduction nitrided in the presence of a liquid-phase forming agent in an atmosphere which satisfies at least one of the following conditions.

(1) The concentration of carbon monoxide in a reaction atmosphere is adjusted to 20 to 50 vol %.
(2) The concentration of nitrogen in a reaction atmosphere is adjusted to 10 to 80 vol %.

Alumina Powder

In the production process of the specific AlN crystal particles of the present invention, as alumina used as a starting material, alumina having an α, γ, θ, δ, η, κ or χ crystal structure, boehmite, diaspore, gibbsite, bayerite and toddite all of which are dehydrated by heating to be totally or partially converted into α-alumina eventually may be used. Although they may be used alone or as a mixture, α-alumina, γ-alumina and boehmite which have high reactivity and are easily controlled are advantageously used.

Alumina used in the present invention is used as alumina agglomerated particles having an average particle diameter of 3 to 110 μm which are agglomerates of alumina particles having an average particle diameter of 0.1 to 3 μm. The average particle diameter of the alumina particles having an average particle diameter of 0.1 to 3 μm is preferably 0.5 to 2 μm. When the average particle diameter is smaller than 0.1 μm, the diameter is not increased, and aluminum nitride fine powders may be produced in large quantities. When the above average particle diameter is not less than 3 μm, alumina may remain in the aluminum nitride powders, or single crystallization hardly occurs with the result that a polycrystal may be obtained.

The particle diameters of the obtained specific AlN crystal particles can be adjusted according to the average particle diameter of the above alumina agglomerated particles.

Carbon Powder

As the carbon powder which is a reducing agent used in the present invention, carbon black and graphite powders may be used. As the carbon black, carbon black obtained by a furnace method or channel method and acetylene black may be advantageously used. The specific surface area of the carbon black is preferably 0.01 to 500 $m^2/g$.

Synthetic resin condensates such as phenol resin, melamine resin, epoxy resin and furanphenol resin, hydrocarbon compounds such as pitch and tar, and organic compounds such as cellulose, saccharose, polyvinylidene chloride and polyphenylene may be used as carbon sources as long as the effect of the present invention is not impaired.

Liquid-Phase Forming Agent

The liquid-phase forming agent used in the present invention is an element or compound which can co-melt with alumina, as exemplified by alkali metals, alkali earth metals, rare earth metals, fluorine, silicon, phosphorus, chlorine and compounds thereof. An element or compound which can co-melt with alumina at a temperature of 1,000 to 1,900° C. is advantageously used. When a compound which can co-malt with alumina at a temperature lower than 1,000° C. is used as the liquid-phase forming agent, it volatilizes at a temperature range at which a reduction nitriding reaction proceeds, whereby its effect as the liquid-phase forming agent may be reduced. When a compound which can co-melt with alumina at a temperature higher than 1,900° C. is used, before a liquid phase is formed, a reduction nitriding reaction proceeds, whereby mass transfer hardly occurs and the amount of the formed liquid phase decreases with the result that particle growth and crystallization may not proceed completely. The liquid-phase forming agent should be present during the reduction nitriding of an alumina agglomerate.

Stated more specifically, it may be added as a liquid-phase forming agent to the raw materials, or alumina or carbon black containing the liquid-phase forming agent may be used.

Mixing of Raw Materials

In the present invention, the alumina powder, the carbon powder and the liquid-phase forming agent are mixed together to ensure that the amount of the carbon powder becomes preferably 30 to 70 parts by weight, more preferably 40 to 60 parts by weight based on 100 parts by weight of the alumina powder.

The liquid-forming agent is made existent in an amount of preferably 0.05 to 5 parts by weight, more preferably 0.1 to 2 parts by weight based on 100 parts by weight of the above alumina powder.

When the alumina powder is a hydrate, the amount thereof is determined in terms of alumina.

When the amount of the carbon powder is larger than 70 parts by weight, the above carbon powder suppresses contact between alumina particles, thereby preventing particle growth and reducing the average particle diameter of the obtained aluminum nitride powders. When the amount of the carbon powder is smaller than 30 parts by weight, contact between alumina particles occurs frequently, whereby agglomeration takes place and aluminum nitride powders are bonded together since the amount of the residual carbon powder after the completion of the reduction nitriding reaction is small, thereby increasing the amount of agglomerated powders.

When the amount of the above liquid-phase forming agent is smaller than 0.05 part by weight, the amount of the formed liquid-phase becomes small, whereby a satisfactory effect for particle growth and crystallization may not be obtained. When the amount of the liquid-phase forming agent is larger than 5 parts by weight, a large amount of the liquid-phase forming agent remains in the aluminum nitride powders, whereby when it is filled as a filler, heat conductivity tends to degrade.

In the present invention, as the method of mixing together the alumina powder, the carbon powder and the liquid-phase forming agent, any method is acceptable if they become uniform. Mixing is preferably carried out with a blender, mixer or ball mill as mixing means.

Reduction Nitriding

In the process for producing the specific AlN crystal particles of the present invention, reduction nitriding is preferably carried out by heating a mixture of the alumina powder, the carbon powder and the liquid-phase forming agent at a temperature of 1,200 to 1,900° C. while an atmosphere in which the CO content becomes 20 to 50 vol % is maintained.

When the above CO content is outside the above range, for example, the CO content is lower than 20%, a reduction nitriding reaction becomes fast and aluminum nitride particles are formed before full particle growth and single crystallization take place, thereby making it difficult to obtain specific AlN crystal particles having a desired large particle diameter. When the CO content is higher than 50 vol %, the effect of suppressing a nitriding reaction becomes too strong, the nitriding reaction takes long, which is industrially disadvantageous, unreacted alumina may remain according to the circumstances, and a by-product such as oxinitride may be produced.

In the present invention, it is recommended to adjust the CO content in the reaction atmosphere by analyzing the components of the ambient gas and adjusting the supply of a nitrogen gas and the supply of a CO gas so as to obtain the above range. Alternatively, it is possible to adjust the CO content by reducing the supply of a nitrogen gas.

The same effect as the control of the CO content can be obtained by supplying an inert gas except for the nitrogen gas, for example, an argon gas to reduce the content of $N_2$.

In this case, the content of $N_2$ is preferably 10 to 80 vol %.

In the present invention, the components of the above ambient gas are the components of an exhaust gas from a heating furnace.

In the production process of the specific AlN crystal particles of the present invention, the reduction nitriding reaction is carried out at a temperature of preferably 1,200 to 1,900° C., more preferably 1,500 to 1,800° C. for preferably 3 to 20 hours, more preferably 5 to 15 hours while the above-described reaction atmosphere is adjusted.

When the liquid-phase forming agent is added, the time and the temperature at which the liquid-phase forming agent melts during the reduction nitriding reaction and does not volatilize completely during the reaction should be selected.

When the above reduction nitriding time is less than 3 hours, the nitriding reaction does not complete, alumina remains, heat conductivity drops, the particle growth and single crystallization of the aluminum nitride particles do not proceed fully, and fine particles and polycrystal particles may be produced. When the heating time is more than 20 hours, aluminum nitride particles are bonded together, coarse particles tend to be produced, and filling properties into a resin become worse.

In the reaction, known conditions such as temperature elevation rate and retention time during temperature elevation may be employed without restriction.

Oxidation

In the present invention, since the aluminum nitride powders after the reaction contain a surplus carbon powder, the surplus carbon powder is preferably removed by oxidation as required. As an oxidizing gas for the oxidization, a gas which can remove carbon, such as air, oxygen or carbon dioxide may be used without restriction. Air is preferred in consideration of economic efficiency and the oxygen concentration of the obtained aluminum nitride. The treatment temperature is preferably 500 to 900° C., more preferably 600 to 750° C.

When the oxidizing temperature is too high, the surface of aluminum nitride is oxidized excessively, thereby reducing the heat conductivity of aluminum nitride, and when the oxidizing temperature is too low, the surplus carbon powder cannot be removed completely and remain as an impurity. Therefore, suitable oxidizing temperature and suitable time are preferably selected.

Classification

Aluminum nitride powders containing not less than 60 vol %, preferably not less than 70 vol %, more preferably not less than 80 vol %, particularly preferably not less than 90 vol % of the specific AlN crystal particles can be obtained by the above-described production process of the present invention. Aluminum nitride particles except for the above specific AlN crystal particles are, for example, aluminum nitride particles containing aluminum nitride fine particles derived from alumina particles as a raw material in many cases.

As described above, the content of the specific AlN crystal particles in the aluminum nitride powders of the present invention is preferably as high as possible, for example, preferably not less than 90 vol %, particularly preferably not less than 95 vol %.

Therefore, when the content of the specific AlN crystal particles in the aluminum nitride powders obtained by the above process is lower than 60 vol %, the content of the specific AlN crystal particles is preferably increased by classification.

The above classification may be carried out by a known method. For example, sieve classification or airflow classification may be employed.

Application Purpose

The aluminum nitride powders of the present invention may be widely used for various purposes, making use of the properties of the specific AlN crystal particles contained therein, specifically as a filler for heat-radiating materials such as heat-radiating sheets, heat-radiating greases, heat-radiating adhesives, coating materials and heat conductive resins.

Examples of the resin or grease which becomes the matrix of a heat-radiating material include thermosetting resins such as epoxy resin and phenol resin, thermoplastic resins such as polyethylene, polypropylene, polyamide, polycarbonate, polyimide and polyphenylene sulfide, rubbers such as silicone rubber, EPR and SBR, and silicone oil.

Out of these, epoxy-based resins and silicone-based resins are preferred as the matrix of a heat-radiating material, and an addition reaction type silicone rubber is desirably used to obtain a highly flexible heat-radiating member.

To improve the heat conductivity of a heat-radiating material, it is recommended to add 150 to 1,000 parts by weight of a filler based on 100 parts by weight of a resin, rubber or oil. One or several fillers selected from known aluminum nitride powders, alumina, boron nitride, zinc oxide, nitrogen carbide and graphite besides the aluminum nitride powders of the present invention may be filled in this heat-radiating material, and the shapes and the average particle diameters of the aluminum nitride powders of the present invention and another filler should be be selected according to the characteristic properties and application purpose of the heat-radiating material. These fillers may be surface treated with a silane coupling agent, phosphoric acid or phosphoric acid salt. The mixing ratio of the aluminum nitride powders and the filler other than the above powders in the heat-radiating material may be suitably adjusted to a range of 1:99 to 99:1. Additives such as a plasticizer, curing agent, effect promoting agent and release agent may be further added to the heat-radiating material.

The above resin composition can be produced by mixing with a blender or mixer, and the heat-radiating material can be manufactured by molding the resin composition by press molding, extrusion molding or doctor blade method and thermally curing it.

Particle orientation may be controlled in the above molding method so that the specific AlN crystal particles of the present invention can easily form a heat conducting path in the matrix.

Further, the aluminum nitride powders of the present invention may also be used as raw material powders to be sintered by making use of the specific AlN crystal particles contained therein.

That is, since the specific AlN crystal particles of the present invention have a plate-like shape with a high aspect ratio, an aluminum nitride sintered body having high heat conductivity and excellent Vickers hardness and fracture toughness can be obtained by sintering the specific AlN crystal particles in such a manner that the hexagonal faces of the plate-like specific AlN crystal particle are oriented in the same direction as the plane of the obtained sintered body.

Raw material powders to be sintered which have a high content, for example, not less than 60 vol % of the specific AlN crystal particles, are preferably used. Since each particle is relatively large, the raw material powders may be used in combination with small-sized aluminum nitride particles having an average particle diameter of preferably 0.5 to 3 µm, more preferably 0.8 to 1.5 µm to enhance sintering properties. In this case, aluminum nitride fine powders by-produced at the time of producing the above plate-like AlN crystal powders may be used as part or all of the above small-sized aluminum nitride powders.

To mold the powders to be sintered containing the above plate-like specific AlN crystal particles, known techniques may be widely used and are not particularly limited. General molding techniques include dry molding techniques such as die pressing, CIP and vibration molding, and wet molding techniques such as doctor blade and injection. To improve moldability, additives such as a binder, dispersant, lubricant, plasticizer and solvent may be added to the raw material powders to be sintered, and general additives may be used without restriction. To obtain an aluminum nitride sintered body having excellent fracture toughness and Vickers hardness which is an object of the present invention, the planes of the plate-like specific AlN crystal particle are preferably oriented in the same direction as the surface of the above sintered body. Therefore, a known molding technique which can attain such orientation is suitably selected. As the specific molding technique, die pressing is preferred as a dry molding technique, and extrusion molding is preferred as a wet molding technique.

A detailed description is subsequently given of the organic polymer composition and sintered body of the present invention.

<Organic Polymer Composition>

The organic polymer composition of the present invention comprises 100 to 600 parts by mass of the specific AlN crystal particles and 100 parts by mass of an organic polymer in which the specific AlN crystal particles are dispersed. Preferably, the organic polymer composition of the present invention further comprises aluminum nitride particles except for the specific AlN crystal particles in an amount of not more than 20 vol % based on the aluminum nitride crystal particles.

Organic Polymer

The organic polymer used in the present invention is selected from a thermoplastic resin, a thermosetting resin, a polymer gel and an organic polymer liquid. Examples of the organic polymer include thermoplastic resins such as polyethylene, polypropylene, ethylene-propylene copolymer, polymethyl pentene, polyvinyl chloride, polyvinylidene chloride, polyvinyl acetate, ethylene-vinyl acetate copolymer, polyvinyl alcohol, polyacetal, fluororesin (such as polyvinylidene fluoride and polytetrafluoroethylene), polyethylene terephthalate, polybutylene terephthalate, polyethylene 2,6-naphthalate, polystyrene, polyacrylonitrile, styrene-acrylonitrile copolymer, ABS resin, polyphenylene ether (PPE) resin, modified PPE resin, aliphatic polyamides, aromatic polyamides, polyimide, polyamide-imide, polymethacrylic acids (polymethacrylic acid esters such as methyl polymethacrylate), polyacrylic acids, polycarbonate, polyphenylene sulfide, polysulfone, polyether sulfone, polyether nitrile, polyether ketone, polyether ether ketone, polyketone, liquid crystal polymer and ionomer, thermosetting resins such as epoxies, acrylics, urethanes, silicones, phenols, imides, thermosetting type modified PPE's and thermosetting PPE's, polymer gels such as silicone gel, urethane gel and acrylic gel, and organic polymer liquids such as silicone oil.

Another Component

The organic polymer composition of the present invention may further comprise a component except for the specific AlN crystal particles and the organic polymer as long as the excellent effect of the present invention is not markedly impaired. As the component which may be contained in the organic polymer composition of the present invention, one or several fillers selected from alumina, boron nitride, zinc oxide, silicon carbide and graphite may be filled. According to the characteristic properties and application purpose of a heat-radiating material which is made of the organic polymer composition of the present invention, the shapes and average particle diameters of the specific AlN crystal particles of the present invention and a filler except for the above particles should be selected. Examples of the component include additives such as a stabilizer, colorant, plasticizer, lubricant, release agent, antioxidant, curing agent, flame retardant and viscosity control agent.

Composition

Although the content of the specific AlN crystal particles in the organic polymer composition of the present invention is preferably high in order to improve the heat conductivity of the obtained organic polymer composition, it is determined in consideration of the dispersibility of the filler and the moldability of the obtained organic polymer composition. Stated more specifically, the content of the specific AlN crystal particles is determined within a range of 100 to 600 parts by mass based on 100 parts by mass of the organic polymer. When the content of the specific AlN crystal particles is lower than 100 parts by mass, the heat conductivity of a composite material lowers and sufficient characteristic properties cannot be obtained as a heat-radiating material. When the content is higher than 600 parts by mass, viscosity at the time of mixing sharply rises, thereby reducing work efficiency and further causing a mixing failure with the result of a reduction in heat conductivity.

Production Process of Organic Polymer Composition

The organic polymer composition of the present invention is obtained by uniformly mixing together predetermined amounts of the above components with a known mixer according to the type of the organic polymer so as to disperse the specific AlN crystal particles into the organic polymer.

As the above mixer, a commonly used kneader such as a roll, kneader, Banbury mixer or rotating/revolving mixer is generally used.

Molded Product

The molded product of the present invention can be obtained when the above-described thermoplastic resin or thermosetting resin composition is used as the organic polymer. In the above molded product, it is preferred that not less than 50%, preferably not less than 70% of the specific aluminum nitride crystal particles contained in the organic polymer composition should orient such that their hexagonal planes are almost parallel to the surface of the above molded product, specifically ±10° or less with respect to the horizontal plane because the obtained molded product has high heat conductivity. The contact area between specific aluminum nitride crystal particles is increased by orientating the specific aluminum nitride crystal particles as described above, thereby making it possible to further improve heat conductivity.

The method of molding the molded product of the present invention is not particularly limited, and conventionally known molding techniques such as injection molding, transfer molding, extrusion molding, bulk molding, compound molding, compression molding and casting using a solvent may be suitably employed according to the type of the organic polymer.

In the production method of the above molded product, known methods for orienting the specific aluminum nitride crystal particles may be employed without restriction. For example, the specific aluminum nitride crystal particles contained in the organic polymer composition can be oriented by carrying out stretching and compression while the organic polymer is softened.

The shape of the molded product of the present invention is not limited as long as the effect of the present invention is not markedly impaired. Examples of the shape include sheet-like, film-like, disk-like and rectangular shapes. Since the specific AlN crystal particles of the present invention are excellent in balance between heat conductivity and strength as well as moldability, a sheet and a film obtained by compression molding the organic polymer composition of the present invention are particularly advantageously used for various purposes.

Application Purpose

The organic polymer composition of the present invention is used as a material for heat-radiating members for radiating heat from a semiconductor part to be mounted on home electric appliances, automobiles and notebook personal computers efficiently, and its use differs according to the type of the organic polymer composition. For example, a silicone resin composition, fluororesin composition, polybutadiene composition and acrylic resin composition may be used for heat-radiating sheets, a silicone gel composition may be used for heat-radiating spacers, an epoxy resin composition and imide-based resin composition may be used for highly heat conducting/insulating adhesive films, an epoxy resin composition, phenolic resin composition and polyimide resin composition may be used for heat conductive adhesives, a silicone gel composition, urethane gel composition and acrylic gel composition may be used for heat conductive gels, a silicone oil composition may be used for heat conductive greases, a low-molecular polyethylene composition and low-molecular polypropylene composition may be used for phase change materials, and epoxy resin may be used for highly heat conductive sealants.

<Sintered Body>

In the aluminum nitride sintered body of the present invention, at least part of the hexagonal planes of the aluminum nitride crystal particle orients almost in the same direction as the flat plane of the sintered body. As for the physical properties of the aluminum nitride sintered body, the fracture toughness is not less than 5 MPa·$^{1/2}$, the heat conductivity is 150 to 230 W/m·k, and the Vickers hardness is 11 to 16 GPa.

In the above aluminum nitride sintered body, preferably, the ratio of the area occupied by the specific aluminum nitride particles out of the aluminum nitride crystal particles constituting the sintered body is 50 to 90% of the cross section.

In the aluminum nitride sintered body of the present invention, the state in which the hexagonal planes of the specific aluminum crystal particles orient almost in the same direction as the surface of the above sintered body is such that most of the hexagonal faces of the specific aluminum nitride crystal particles contained in the sintered body are existent almost parallel to the surface of the sintered body.

The ratio of the hexagonal planes oriented in the same direction as the surface of the sintered body of the specific aluminum nitride crystal particles can be obtained by calculating the ratio of the peak intensity of a (hkl)=(002) plane to the total of the peak intensity of a (hkl)=(100) plane and the peak intensity of the (hkl)=(002) plane obtained by X-ray diffraction measurement since the hexagonal planes of the specific aluminum nitride crystal particles are parallel to the (hkl)=(002) plane.

That is, the ratio (to be referred to as "orientation ratio" hereinafter) of the (002) planes oriented in the same direction as the surface of the above sintered body of the aluminum nitride crystal particles contained in the aluminum nitride sintered body is calculated by the following measurement method.

X-ray diffraction measurement was conducted by using the SmartLab (trade name) of Rigaku Corporation. The measurement surface of a sample was the surface of a sintered body.

X-ray source: Cu-Kα 40 kV-200 mA
2θ scanning range: 10 to 90°
2θ scanning rate: 40°/min
2θ scanning step width: 0.02°
Number of Times of Measurement: 1/Sample The obtained diffraction peaks are a peak identified as aluminum nitride and a peak identified as one or several grain boundary phases produced from a sintering aid. When the peak intensity of the (hkl)=(002) plane of the diffraction peak identified as aluminum nitride is represented by I(002) and the peak intensity of the (hkl)=(100) plane is represented by I(100), the orientation ratio (R) is represented by the following equation.

$$R(\%)[I(002)/\{I(002)+I(100)\}]\times 100$$

In the aluminum nitride sintered body of the present invention, the state in which the hexagonal planes of the specific aluminum nitride crystal particles orient in the same direction as the surface of the above sintered body is preferably such that the orientation ratio obtained by the above method is not less than 70%, specifically not less than 75%.

The mechanical strength, particularly fracture toughness, as well as heat conductivity of the aluminum nitride sintered body of the present invention can be greatly improved by the orientation of the above specific aluminum nitride crystal particles.

That is, by suitably adjusting the orientation of the above specific aluminum nitride crystal particles and the amount of the specific aluminum nitride crystal particles, the sintered body of the present invention can be provided with excellent characteristic properties such as a fracture toughness of not less than 5 MPa·m$^{1/2}$, a heat conductivity of 150 to 230 W/m·K, specifically 160 to 190 W/m·K, and a Vickers hardness of 11 to 16 GPa, specifically 12 to 15 GPa all of which are not attained by a conventional aluminum nitride sintered body.

Production Process of Aluminum Nitride Sintered Body

Although the production process of the aluminum nitride sintered body of the present invention is not particularly limited, as a typical example of the production process, the aluminum nitride sintered body can be obtained by using aluminum nitride powders containing 60 to 98 mass % of the specific aluminum nitride crystal particles and 2 to 40 mass % of small-sized aluminum nitride particles having an average particle diameter of 0.5 to 3 μm and molding the powders such that the hexagonal planes of the specific aluminum nitride crystal particles are oriented in the same direction as the flat surface of the obtained sintered body.

In the production process of the aluminum nitride sintered body of the present invention, the specific aluminum nitride crystal particles are existent in the aluminum nitride powders in use in an amount of 60 to 98 mass %, preferably 70 to 95 mass % in order to attain the object of the present invention.

Since each of the specific aluminum nitride crystal particles is relatively large as described above, when sintering is carried out, they are generally used in combination with 2 to 40 mass %, specifically 5 to 40 mass % of "small-sized aluminum nitride particles" having an average particle diameter of 0.5 to 3 preferably 0.8 to 1.5 μm to obtain aluminum nitride powders to be sintered. When the average particle diameter of the above small-sized aluminum nitride particles is smaller than 0.5 μm, the concentration of impurity oxygen tends to become high, thereby reducing sintering properties with the result that an aluminum nitride sintered body having high heat conductivity is not obtained. Meanwhile, when the average particle diameter of the small-sized aluminum nitride particles is larger than 3 μm, the filling properties of the aluminum nitride powders in the molded product tend to degrade, thereby reducing sintering properties with the result that an aluminum nitride sintered body having high heat conductivity is not obtained.

In the aluminum nitride powders to be sintered, the upper limit of the content of the above small-sized aluminum nitride particles may be suitably determined to ensure that the total amount of aluminum nitride particles becomes 100 mass % in consideration of particles other than the specific aluminum nitride crystal particles of interest in the production process of the specific aluminum nitride crystal particles.

Preferably, the small-sized aluminum nitride particles used in the present invention have a concentration of impurity oxygen of 0.6 to 1.2% and a specific surface area of 2.4 to 3.6 m$^2$/g in order to achieve high sintering properties and excellent physical properties for the sintered body.

To produce the aluminum nitride sintered body of the present invention, it is desired that a sintering aid should be added to the aluminum nitride powders to be sintered. The sintering aid in use is preferably CaO or $Y_2O_3$ but may be another sintering aid except for these. Examples of the sintering aid include alkali earth compound oxides such as SrO and BaO and salts, and rare earth compounds such as $La_2O_3$, $CeO_2$, $Nd_2O_3$, $Gd_2O_3$ and $Dy_2O_3$ all of which do not inhibit heat conductivity. The alkali earth compound or the rare earth compound is preferably added in an amount of 3 to 7 mass % based on the total mass of the specific aluminum nitride crystal particles and the small-sized aluminum nitride particles. When the content of the alkali earth compound or the rare earth compound is lower than 3 mass %, a liquid phase is not completely formed, and a portion which is not fully densified tends to be formed. Further, the improvement of heat conductivity becomes unsatisfactory, and the characteristic properties of the aluminum nitride sintered body cannot be developed completely. Meanwhile, when the content is higher than 7 mass %, a surplus liquid phase is formed, whereby the aid easily moves to the outside of the sintered body with the result that color unevenness may occur due to the excretion of this aid. When the sintered body is used as an insulating/head-radiating substrate for semiconductor devices, it may trigger the reduction of bonding property or adhesion to a metal.

The method of mixing the above specific aluminum nitride crystal particles and the small-sized aluminum nitride particles in a specific ratio and a sintering aid in a specific ratio may be a known method and not particularly limited. As a general mixing means, a ball mill, vibration mill, mixer or attritor may be used.

In the production process of the sintered body of the present invention, it is desirable and important that the aluminum nitride powders to be sintered which contain the specific aluminum nitride crystal particles should be molded in such a manner that the hexagonal planes of the specific aluminum nitride crystal particles are oriented in the same direction as the surface of the obtained sintered body.

As the method of molding the aluminum nitride powders to be sintered which contain the specific aluminum nitride crystal particles, known techniques may be widely used and not particularly limited. As general molding techniques, dry molding techniques such as die pressing, CIP and vibration molding, and wet molding techniques such as extrusion, doctor blade and injection may be used. In order to improve moldability, additives such as a binder, dispersant, lubricant, plasticizer and solvent may be added to the aluminum nitride powders to be sintered, and general additives may be used without restriction. To obtain an aluminum nitride sintered body having excellent fracture toughness and Vickers hardness which is an object of the present invention, the hexagonal planes of the specific aluminum nitride crystal particles need to be oriented in the same direction as the flat surface of the above sintered body. Therefore, a molding technique which can attain such orientation must be suitably selected. For the above reason, as the molding technique which is suitable for attaining the effect of the present invention fully, die pressing is preferred as the dry molding technique, and extrusion molding is preferred as the wet molding technique.

In the production process of the sintered body of the present invention, the aluminum nitride sintered body is obtained by heating in such a manner that the hexagonal planes of the specific aluminum nitride crystal particles are oriented in the same direction as the surface of the obtained sintered body.

In this case, when an organic compound is used as a binder, dispersant, lubricant, plasticizer or solvent to improve the moldability of the molded product, degreasing may be carried out before heating. As degreasing conditions, known conditions may be employed without restriction. For example, degreasing is generally carried out at a temperature of 300 to 1,000° C. in an oxidizing atmosphere or nonoxidizing atmosphere for 1 to 10 hours. At this point, preferably, carbon remains in the obtained degreased product as little as possible. When surplus carbon remains, oxygen existent on the surface of the aluminum nitride particle is reduced by carbon, thereby not producing a suitable amount of a liquid phase, which may cause the reduction of sintering properties and heat conductivity.

In the present invention, known sintering methods are widely employed and not particularly limited. As a commonly used sintering method, normal-pressure sintering, pressure sintering such as hot pressing or HIP (Hot Isostatic Pressing), and plasma sintering such as SPS (Spark Plasma Sintering) may be used.

In the present invention, when SPS is selected as a sintering method, heating is preferably carried out at a temperature of higher than 1,300° C. to 1,600° C. or lower. When the heating temperature is 1,300° C. or lower, satisfactory densification is impossible and when the heating temperature is higher than 1,600° C., the sintering aid tends to ooze to the outside of the sintered body, which leads to color unevenness and the reduction of adhesion to a metallized layer as described above. The heating time should be 1 to 30 minutes.

When normal-pressure sintering is selected, the heating temperature should be higher than 1,700° C. to 1,900° C. or lower, and the heating time may be 2 to 10 hours. When heating is carried out for a long time, color unevenness tends to occur due to the particle growth of the aid and the movement of the aid to the outside of the sintered body. Therefore, the heating time is preferably 2 to 7 hours.

In the present invention, as for the heating atmosphere, known conditions may be employed without restriction, and heating is preferably carried out in a nonoxidizing atmosphere such as nitrogen atmosphere or under vacuum.

A weight may be mounted in the heating step.

According to the production process of the aluminum nitride sintered body of the present invention which has been explained above, a novel aluminum nitride sintered body having high heat conductivity and high mechanical strength is obtained stably.

EXAMPLES

The following examples are provided for the purpose of further illustrating the present invention but are in noway to be taken as limiting. Physical properties in examples and comparative examples were measured by the following methods. The following measurement methods (1) to (8) were used in Examples 1 to 14 and Comparative Examples 1 to 7, and the following measurement methods (9) to (19) were used in Examples 15 to 20 and Comparative Examples 8 to 12.

(1) Specific Surface Area

The specific surface area was measured by a BET one-point method.

(2) Average Particle Diameter

A sample was dispersed in a 5% sodium pyrophosphate aqueous solution by means of a homogenizer to measure its average particle diameter ($D_{50}$) with a laser diffraction particle size distribution apparatus (MICROTRAC HRA of Nikkiso Co., Ltd.).

(3) Aluminum Nitride Conversion Rate

This was obtained from the ratio of the peak (32.2°) of aluminum nitride (AlN) and the peak (43.5°) of an alumina component (α-alumina) by using a calibration curve method (following equation (1)). When another component is contained, the main peak of the component is selected and added to the denominator of the following equation (1).

Aluminum nitride conversion rate(%)=peak intensity of AlN/(peak intensity of AlN+peak intensity of alumina)×100 (1)

(4) Observation of Ridge Part of Crystal Particle, Measurement of L/D Ratio and Measurement of Vol % of Specific Aluminum Nitride Crystal Particles The crystal particles were observed through a scanning electron microscope (S-2600 of Hitachi, Ltd.). 20 samples were collected from arbitrary sites of one kind of the obtained aluminum nitride powders to photograph each sample in 10 fields of view at a magnification of 1,000 so as to check whether the crystal particles within the field had a round ridge part. Similarly, the aspect ratio (L/D) of each of the crystal particles within the field was obtained by measuring the average distance "D" between two opposed corners within the hexagonal plane and the distance "L" between the planes. Each value was given as the average value of all the measurement data. As for the ratio (vol %) of the specific aluminum nitride crystal particles, in the measurement of the above samples, the specific aluminum nitride crystal particles had a shape similar to a regular hexagonal shape and the aluminum nitride fine powders had a shape similar to a spherical shape, and the volume of the particles within the photographing field was obtained from the measurement values to calculate the volume ratio of the specific aluminum nitride crystal particles to all the particles as the average value of all the data.

(5) True Density

The true density of the specific aluminum nitride crystal particles was obtained by carrying out the sieve classification of aluminum nitride powders and measuring aluminum nitride powders containing not less than 99 vol % of the specific aluminum nitride crystal particles with a dry automatic densitometer (AccuPyc1330 of Shimadzu Corporation).

(6) Crystallinity

The crystallinity was evaluated from a diffraction pattern by applying X-rays to a single specific aluminum nitride crystal particle by means of a fully automatic horizontal type multi-purpose X-ray diffraction apparatus (SmartLab of Rigaku Corporation).

(7) Heat Conductivity (W/m·K)

Heat conductivity=heat diffusion rate×density×specific heat

The heat diffusion rate ($cm^2/s$) was measured by a laser flash method. The density ($g/cm^3$) was measured by an Archimedes method. The specific heat (J/g·K) was measured by a DSC method.

(8) Orientation Ratio of Specific Aluminum Nitride Crystal Particles

The cross section of a sheet-like molded product was photographed to count the number of particles whose hexagonal plate-like planes were arranged almost in the same direction as the surface of the sheet-like molded product out of 200 arbitrary specific aluminum nitride crystal particles within the field of view so as to obtain the ratio of the number of the above particles to 200 particles as orientation ratio.

(9) Average Particle Diameter

This was obtained by a laser diffraction method using the MICROTRACK-HRA (trade name) of Nikkiso Corporation. A dispersion prepared by adding aluminum nitride powders to a solution prepared by adding a 5% sodium pyrophosphate aqueous solution to 90 ml of water and dispersing the powders with a homogenizer at an output of 200 mA for 3 minutes was measured. The average particle diameter (D50) was obtained by the above method.

(10) Oxygen Concentration

Oxygen extracted by melting aluminum nitride powders in an inert gas by means of the oxygen.nitrogen simultaneous analyzer (EMGA-620W/C) (trade name) of Horiba, Ltd. in accordance with an impulse heat-fusing method was measured as carbon monoxide by means of a non-dispersion infrared detector. A He gas (purity: not less than 99.995%) was used as a carrier gas.

(11) Specific Surface Area

This was obtained by means of the FlowSobe 2300 flow-type surface area automatic measuring instrument of Shimadzu Corporation in accordance with a BET method making use of $N_2$ adsorption.

(12) Average Distance (D) Between Two Opposed Corners within Hexagonal Plane and Average Distance (L) Between Planes of Specific Aluminum Nitride Crystal Particle The crystal particles were observed through a scanning electron microscope (S-2600 of Hitachi, Ltd.) (trade name). 10 fields of view were photographed at a magnification at which all of the arbitrarily selected particles were included in the field to check whether the crystal particles within the photographing field had a round ridge part. 10 particles were photographed at a magnification at which all of the arbitrarily selected particles were included in the field to measure their long diameters (d) and the distances (1) between planes so as to obtain the average long diameter (D) and the average distance (L) between planes by averaging the measurement data of 10 particles. The aspect ratio (L/D) was obtained from the obtained average long diameter (D) and the average distance (L) between planes.

(13) True Density

The true density of the specific aluminum nitride crystal particles was measured by means of a dry type automatic densitometer (AccuPyc1330 of Shimadzu Corporation).

(14) Density of Sintered Body

The density of the aluminum nitride sintered body was measured by an Archimedes method.

(15) Fracture Toughness

This was calculated from Vickers hardness measured with the AVK-CO (trade name) Vickers hardness tester of Akashi Co., Ltd. by an IF method in accordance with the measurement method specified in JIS R 1607:1995.

(16) Heat Conductivity

The heat conductivity of the prepared aluminum nitride sintered body was measured with the LFA-502 (trade name) of Kyoto Electronics Manufacturing Co., Ltd. by a laser flash method in accordance with the measurement method specified in JIS R1611.

(17) Vickers Hardness

This was measured by means of the AVK-CO (trade name) Vickers hardness tester of Akashi Co., Ltd. in accordance with the measurement method specified in JIS R 1610:1991.

(18) Area Occupying Ratio of Specific Aluminum Nitride Crystal Particles on Cross Section of Aluminum Nitride Sintered Body The cross section of the aluminum nitride sintered body in 10 fields of view was observed at a magnification of 1.0K through a scanning electron microscope (S-2600 of Hitachi, Ltd.) (trade name) to analyze the ratio of the area (S1) occupied by crystal particles as large as 10 μm² or more to the area (S2) of the field by means of an image analyzing system (IP-1000PC of Asahi Chemical Industry Co., Ltd.) (trade name) so as to calculate the area occupying ratio (r) of the specific aluminum nitride crystal particles from the following equation (2).

$$r(\%) = S1/S2 \times 100 \tag{2}$$

Example 1

Alumina fine powder agglomerates having an average particle diameter of 5.6 μm which were agglomerates of fine powders having an average particle diameter of 1.5 μm and carbon black having a specific surface area of 125 m²/g were mixed together. The mass ratio ($C/Al_2O_3$) of carbon black to the alumina powders was 0.50.

The above mixed powders were heated at a heating temperature of 1,750° C. for a heating time of 10 hours. At the time of heating, the content of $N_2$ in the atmosphere was 70 vol % and the content of CO was 30 vol %. The content of CO was obtained by measuring an exhaust gas from a heating furnace, and the ratio was controlled by adjusting the flow rates of $N_2$ and CO introduced into the heating furnace.

The powders after nitriding were oxidized at 700° C. in an air atmosphere for 10 hours to obtain aluminum nitride powders. The specific surface area, average particle diameter, aluminum nitride conversion rate and vol % of the specific aluminum nitride crystal particles of the obtained aluminum nitride powders and the average distance (D) between two opposed corners within the hexagonal plane, L/D average value and true density of the specific AlN crystal powders were measured and shown in Table 1.

The obtained aluminum nitride powders were filled into an epoxy resin to prepare a resin composition so as to evaluate its heat conductivity. Stated more specifically, a mixture of 100 parts by weight of the epoxy resin (JER807 of Mitsubishi Chemical Corporation) and 32 parts by weight of a curing agent (alicyclic polyamine-based curing agent, JER Cure 113 of Mitsubishi Chemical Corporation) was prepared. Then, 20 wt % of the base resin and 80 wt % of the above specific AlN crystal particles were mixed together by means of a rotating/revolving mixer (ARE-500 of THINKY) to obtain a resin composition.

This was injected into a mold and cured at a temperature of 120° C. and a pressure of 5 MPa for a retention time of 1 hour by using a thermal press to manufacture a sheet having a diameter of 10 mm and a thickness of 1 mm. When the heat conductivity of the sheet was measured by the laser flash method, it was 8.0 W/m·K.

Example 2

Aluminum nitride powders were obtained in the same manner as in Example 1 except that 1 part by weight of magnesium oxide was added to the raw material mixed powders in Example 1. The specific surface area, average particle diameter and aluminum nitride conversion rate of the obtained aluminum nitride powders and the vol %, average long diameter (D), average L/D value and true density of the specific aluminum nitride crystal particles were measured. The results are shown in Table 1.

Figure 2:
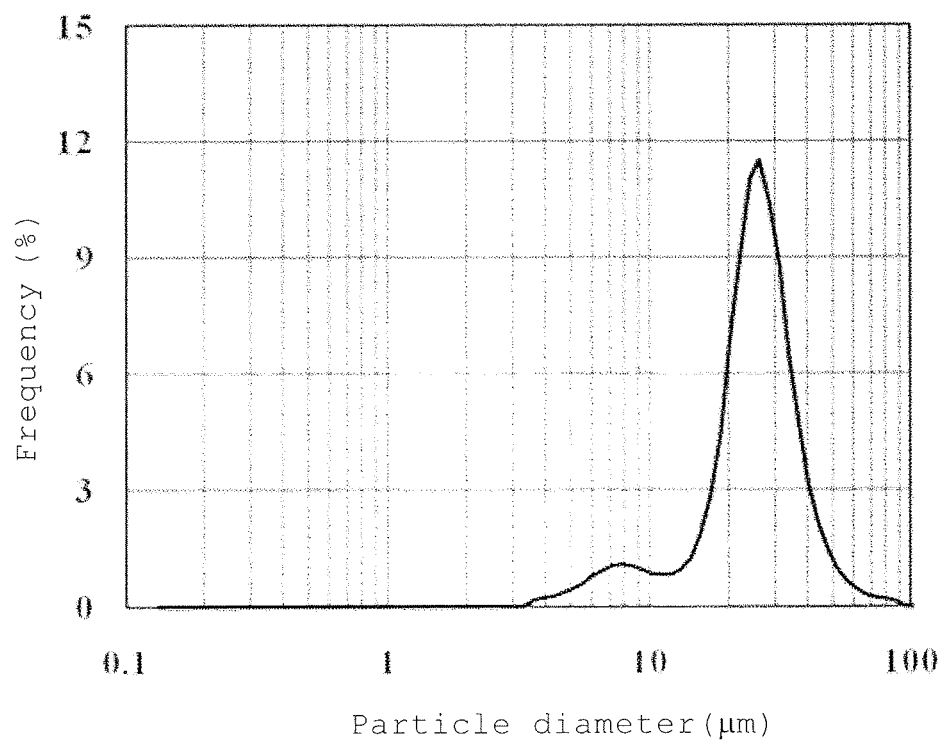
FIG. 2 is a graph showing the particle size distribution of the aluminum nitride powders obtained in Example 2.

An electron photomicrograph (SEM photo) of the aluminum nitride powders obtained in this example is shown in FIG. 2, and a particle size distribution curve measured by means of a laser diffraction particle size distribution apparatus is shown in FIG. 2.

Further, a sheet was formed in the same manner as in Example 1 by using the obtained aluminum nitride powders to measure its heat conductivity. The result is shown in Table 1 as well.

Example 3

Aluminum nitride powders were obtained in the same manner as in Example 1 except that 1 part by weight of sulfur was added to the raw material mixed powders in Example 1. The specific surface area, average particle diameter and aluminum nitride conversion rate of the obtained aluminum nitride powders and the vol %, average distance (D) between two opposed corners within the hexagonal plane, average L/D value and true density of the specific aluminum nitride crystal particles were measured. The results are shown in Table 1.

Further, a sheet was formed in the same manner as in Example 1 by using the obtained aluminum nitride powders to measure its heat conductivity. The result is shown in Table 1 as well.

Example 4

Aluminum nitride powders were obtained in the same manner as in Example 1 except that 2 parts by weight of sulfur was added to the raw material mixed powders in Example 1. The specific surface area, average particle diameter and aluminum nitride conversion rate of the obtained aluminum nitride powders and the vol %, average distance (D) between two opposed corners within the hexagonal plane, average L/D value and true density of the specific aluminum nitride crystal particles were measured. The results are shown in Table 1.

Further, a sheet was formed in the same manner as in Example 1 by using the obtained aluminum nitride powders to measure its heat conductivity. The result is shown in Table 1 as well.

Example 5

Aluminum nitride powders were obtained in the same manner as in Example 2 except that the average particle diameter of alumina fine powder agglomerates in Example 2 was changed to 3.6 μm. The specific surface area, average particle diameter and aluminum nitride conversion rate of the obtained aluminum nitride powders and the vol %, average distance (D) between two opposed corners within the hexagonal plane, average L/D value and true density of the specific aluminum nitride crystal particles were measured. The results are shown in Table 1.

Further, a sheet was formed in the same manner as in Example 1 by using the obtained aluminum nitride powders to measure its heat conductivity. The result is shown in Table 1 as well.

Example 6

Aluminum nitride powders were obtained in the same manner as in Example 2 except that the average particle diameter of the alumina fine powder agglomerates in Example 2 was changed to 10.8 μm. The specific surface area, average particle diameter and aluminum nitride conversion rate of the obtained aluminum nitride powders and the vol %, average distance (D) between two opposed corners within the hexagonal plane, average L/D value and true density of the specific aluminum nitride crystal particles were measured. The results are shown in Table 1.

Further, a sheet was formed in the same manner as in Example 1 by using the obtained aluminum nitride powders to measure its heat conductivity. The result is shown in Table 1 as well.

Example 7

Aluminum nitride powders were obtained in the same manner as in Example 1 except that the average particle diameter of the alumina fine powder agglomerates in Example 1 was changed to 10.8 μm and 2 parts by weight of magnesium oxide was added to the raw material mixed powders. The specific surface area, average particle diameter and aluminum nitride conversion rate of the obtained aluminum nitride powders and the vol %, average distance (D) between two opposed corners within the hexagonal plane, average L/D value and true density of the specific aluminum nitride crystal particles were measured. The results are shown in Table 1.

Further, a sheet was formed in the same manner as in Example 1 by using the obtained aluminum nitride powders to measure its heat conductivity. The result is shown in Table 1 as well.

Example 8

Aluminum nitride powders were obtained in the same manner as in Example 2 except that the $N_2$ content of the atmosphere in Example 2 was changed to 80% and the CO content was changed to 20%. The specific surface area, average particle diameter and aluminum nitride conversion rate of the obtained aluminum nitride powders and the vol %, average distance (D) between two opposed corners within the hexagonal plane, average L/D value and true density of the specific aluminum nitride crystal particles were measured. The results are shown in Table 1.

Further, a sheet was formed in the same manner as in Example 1 by using the obtained aluminum nitride powders to measure its heat conductivity. The result is shown in Table 1 as well.

Example 9

The aluminum nitride powders prepared in Example 8 were classified by using a sieve having an opening size of 20 μm to reduce the amount of fine powders contained in the aluminum nitride powders. The specific surface area, average particle diameter and aluminum nitride conversion rate of the obtained aluminum nitride powders and the vol %, average distance (D) between two opposed corners within the hexagonal plane, average L/D value and true density of the specific aluminum nitride crystal particles were measured. The results are shown in Table 1.

Further, a sheet was formed in the same manner as in Example 1 by using the obtained aluminum nitride powders to measure its heat conductivity. The result is shown in Table 1 as well.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Specific surface area [m²/g] | 0.45 | 0.10 | 0.11 | 0.08 | 0.18 | 0.08 | 0.07 | 0.75 | 0.12 |
| Average particle diameter [μm] | 7.3 | 25.6 | 24.2 | 40.1 | 17.1 | 43.4 | 107.2 | 13.4 | 28.3 |
| AlN conversion rate [%] | 100 | 100 | 100 | 100 | 100 | 100 | 100 | 100 | 100 |
| Crystal | single crystal | single crystal | single crystal | single crystal | single crystal | single crystal | single crystal | single crystal | single crystal |
| Shape of specific face of crystal | regular hexagonal | regular hexagonal | regular hexagonal | regular hexagonal | regular hexagonal | regular hexagonal | regular hexagonal | regular hexagonal | regular hexagonal |
| L [μm] | 4.4 | 6.1 | 5.3 | 6.2 | 6.3 | 6.1 | 10.8 | 2.9 | 6.6 |
| D [μm] | 7.8 | 26.7 | 25.2 | 44.0 | 19.1 | 46.7 | 108.0 | 14.0 | 28.7 |
| L/D | 0.56 | 0.23 | 0.21 | 0.14 | 0.33 | 0.13 | 0.10 | 0.21 | 0.23 |
| True density [g/cm³] | 3.23 | 3.24 | 3.23 | 3.23 | 3.22 | 3.23 | 3.22 | 3.23 | 3.24 |
| Volume of specific AlN crystal particles [%] | 93 | 96 | 96 | 91 | 90 | 93 | 92 | 74 | 97 |
| Heat conductivity [W/m · K] | 8.0 | 8.4 | 8.3 | 8.7 | 8.4 | 8.8 | 8.5 | 7.5 | 8.9 |

Ex.: Example

Comparative Example 1

Aluminum nitride powders were obtained in the same manner as in Example 2 except that the $N_2$ content of the atmosphere at the time of heating was changed to 90% and the CO content was changed to 10%. The specific surface area, average particle diameter and aluminum nitride conversion rate of the obtained aluminum nitride powders were measured. The results are shown in Table 2.

Figure 3:
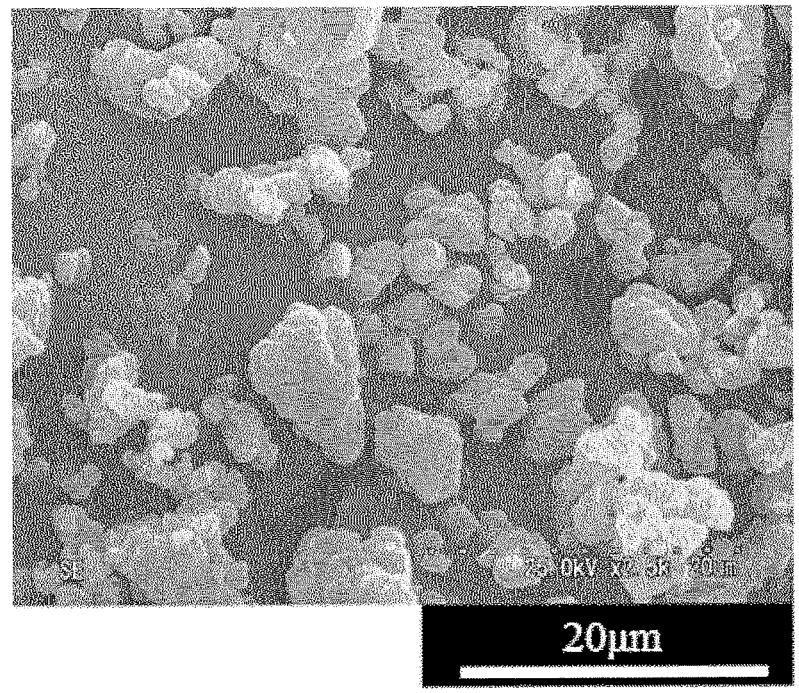
FIG. 3 is a photomicrograph showing the particle structure of aluminum nitride powders obtained in Comparative Example 1.

When the obtained powders were observed through an electron microscope, they were not hexagonal in shape but agglomerates of aluminum nitride fine powders. An SEM photo of the aluminum nitride powders obtained in this comparative example is shown in FIG. 3.

Further, when a sheet was formed in the same manner as in Example 1 by using the obtained aluminum nitride powders to measure its heat conductivity by the laser flash method, it was 4.0 W/mk.

Comparative Example 2

Aluminum nitride powders were obtained in the same manner as in Example 1 except that spherical alumina having an average particle diameter of 10.1 μm and a specific surface area of 0.26 m²/g obtained by a thermal spraying method was used. The specific surface area, average particle diameter and aluminum nitride conversion rate of the obtained aluminum nitride powders were measured. The results are shown in Table 2.

When the obtained powders were observed through an electron microscope, they were not hexagonal in shape but a polycrystal retaining the shape of the raw material.

TABLE 2

| | Comparative Example 1 | Comparative Example 2 |
|---|---|---|
| Specific surface area [m²/g] | 0.70 | 0.52 |
| Average particle diameter [μ/g] | 5.7 | 10.1 |
| AlN conversion rate [%] | 100 | 82 |
| Crystal | polycrystal | polycrystal |
| L/D | — | — |
| Heat conductivity [W/m · K] | 4.0 | — |

Example 10

Alumina fine powder agglomerates having an average particle diameter of 5.6 μm which were agglomerates of fine powders having an average particle diameter of 1.5 μm and carbon black having a specific surface area of 125 m²/g were mixed together. The mass ratio ($C/Al_2O_3$) of carbon black to the alumina powders was 0.50.

The above mixed powders were heated at a heating temperature of 1,750° C. for a heating time of 10 hours. At the time of heating, the $N_2$ content of the atmosphere was 70 vol %, and the Co content was 30 vol %. The CO content was obtained by measuring an exhaust gas from the heating furnace, and the ratio was controlled by adjusting the flow rates of $N_2$ and CO introduced into the heating furnace.

The powders after nitriding were oxidized at 700° C. in an air atmosphere for 10 hours to obtain aluminum nitride powers containing specific AlN crystal particles.

The specific AlN crystal particles contained in the aluminum nitride powders obtained by the above method were single crystals and had an average long diameter (D) of 10 µm, an average distance (L) between planes of 5.6 µm, an average L/D value of 0.56 and a true density of 3.23 g/cm$^3$. The content of the specific AlN crystal particles in the obtained aluminum nitride powders was 93 vol % (the ratio (volume) of AlN particles except for the specific AlN crystal to the specific AlN crystal particles was 7.5 vol %).

A highly heat conductive molded product was manufactured by using the above aluminum nitride powders containing the specific AlN crystal particles as a filler and an epoxy resin as an organic polymer component.

Stated more specifically, a mixture of 100 parts by weight of an epoxy resin (JER807 of Mitsubishi Chemical Corporation) as the organic polymer component and 32 parts by weight of a curing agent (alicyclic polyamine-based curing agent, JER Cure 113 of Mitsubishi Chemical Corporation) was prepared. Then, 100 parts by weight of the above organic polymer component and the aluminum nitride powders obtained by the above method were mixed together by means of a rotating/revolving mixer (ARE-500 of THINKY) to ensure that the content of the specific AlN crystal particles became 117 parts by weight so as to obtain a resin mixture.

The above resin mixture was injected into a mold to be cured at a temperature of 120° C. and a pressure of 5 MPa for a retention time of 1 hour by using a thermal press so as to produce a sheet having a diameter of 100 mm and a thickness of 1 mm. The measurement results of the heat conductivity of the obtained sheet and the orientation ratio of the aluminum nitride crystal particles are shown in Table 3.

Example 11

Specific AlN crystal particles were obtained in the same manner as in Example 10 except that 1 part by weight of magnesium oxide was added to the raw material mixed powders in Example 10.

The specific AlN crystal particles contained in the aluminum nitride powders obtained by the above method were single crystals and had an average distance (D) between two opposed corners within the hexagonal plane of 28 µm, an average distance (L) between planes of 6.4 an average L/D value of 0.23 and a true density of 3.24 g/cm$^3$. The content of the specific AlN crystal particles in the obtained aluminum nitride powders was 96 vol % (the ratio (volume) of AlN particles except for the specific AlN crystal to the specific AlN crystal particles was 4.2 vol %).

A highly heat conductive molded product was manufactured by using the above specific AlN crystal particles as a filler and an epoxy resin as the organic polymer component.

The measurement results of the heat conductivity of a sheet obtained in the same manner as in Example 10 except that the epoxy resin shown in Table 3 and the amount shown in Table 3 of the specific AlN crystal particles were used and the orientation ratio of the specific aluminum nitride crystal particles are shown in Table 3.

Example 12

Specific AlN crystal particles were obtained in the same manner as in Example 10 except that the average particle diameter of the alumina fine powder agglomerates in Example 10 was changed to 10.8 µm and 2 parts by weight of magnesium oxide was added to the raw material mixed powders.

The specific AlN crystal particles obtained by the above method were single crystals and had an average long diameter (D) of 110 µm, an average distance (L) between planes of 11 µm, an average L/D value of 0.1 and a true density of 3.22 g/cm$^3$. The content of the specific AlN crystal particles in the obtained aluminum nitride powders was 92 vol % (the ratio (volume) of AlN particles except for the specific AlN crystal to the specific AlN crystal particles was 8.7 vol %).

A highly heat conductive molded product was manufactured by using the above specific AlN crystal particles as a filler and an epoxy resin as the organic polymer component.

The measurement results of the heat conductivity of a sheet obtained in the same manner as in Example 10 except that the epoxy resin shown in Table 3 and the amount shown in Table 3 of the specific AlN crystal particles were used and the orientation ratio of the specific aluminum nitride crystal particles are shown in Table 3.

Example 13

100 parts by weight of silicone oil (KF-96-1000CS of Shin-Etsu Chemical Co., Ltd.) and aluminum nitride powders obtained in the same manner as in Example 10 were fed to a heating oven equipped with a stirrer to ensure that the content of the specific AlN crystal particles became 140 parts by weight and thermally kneaded together to become homogeneous. This mixture was left to be cooled to normal temperature and mixed by means of a paint roll to prepare a grease. The measurement result of the heat conductivity of the obtained grease is shown in Table 3.

Example 14

The following components were kneaded together by means of a roll at 150° C., and the resulting mixture was extruded into a strand which was then cut to produce a pellet. Aluminum nitride powders were prepared to ensure that the amount of specific AlN crystal particles obtained in the same manner as in Example 10 became 140 parts by weight based on 100 parts by weight of a matrix comprising the following components (1) to (4).
Components
(1) Styrene-ethylene/propylene-styrene triblock copolymer [SEPS, manufactured by Kuraray Co., Ltd., trade name: SEPTON] (SEPS having a number average molecular weight of 120,000 and a styrene content of 30 wt %) 100 parts by weight
(2) Polypropylene obtained by polymerization with a metallocene catalyst [Exxon Mobil Corporation, trade name: Achieve] (Mw/Mn=2.0) 10 parts by weight
(3) Paraffin-based oil having a kinetic viscosity at 40° C. of 380 mm$^2$/sec [manufactured by Idemitsu Kosan Co., Ltd., trade name: Diana Process Oil PW380] (weight average molecular weight of 750) 100 parts by weight
(4) Maleic anhydride modified polypropylene [manufactured by Sanyo Chemical Industries, Ltd., trade name: Umex 101
5 parts by weight The heat radiation elastomer composition obtained as described above was molded at a molding temperature of 180° C. by using the DC60E5ASE injection molding machine of Nissei Plastic Industrial Co., Ltd. to produce a sheet having a thickness of 1 mm.

Comparative Examples 3 to 5

The measurement results of the heat conductivities of sheets obtained in the same manner as in Example 10 except that spherical aluminum nitride having an average particle diameter of 20 μm (manufactured by Tokuyama Corporation) shown in Table 3 was used are shown in Table 3.

Comparative Example 6

The measurement result of the heat conductivity of a grease obtained in the same manner as in Example 13 except that spherical aluminum nitride having an average particle diameter of 5 μm (manufactured by Tokuyama Corporation) shown in Table 3 was used is shown in Table 3.

Comparative Example 7

The measurement result of the heat conductivity of a sheet obtained in the same manner as in Example 14 except that spherical aluminum nitride having an average particle diameter of 5 μm (manufactured by Tokuyama Corporation) shown in Table 3 was used is shown in Table 3.

145° C. for a retention time of 10 minutes by a SPS sintering method to obtain a sintered body having a relative density of not less than 95%, a diameter of 30 mm and a thickness of 3 mm.

Example 16

The same operation as in Example 15 was carried out except that 90 parts by weight of the specific aluminum nitride crystal particles and 10 parts by weight of the small-sized aluminum nitride particles were used.

Example 17

The same operation as in Example 15 was carried out except that 80 parts by weight of the specific aluminum nitride crystal particles and 20 parts by weight of the small-sized aluminum nitride particles were used.

TABLE 3

| | Organic polymer | | specific AlN crystal particles (p.b.w) | ratio of other AlN particles[X1] (%) | spherical AlN powders (p.b.w) | orientation degree of ±10° or less, ratio of specific AlN crystal particles (%) | heat conductivity (W/m · K) |
|---|---|---|---|---|---|---|---|
| | Type | (parts by weight) | | | | | |
| Ex. 10 | Epoxy resin | 100 | 117 | 7.5 | 0 | 56 | 2.2 |
| Ex. 11 | Epoxy resin | 100 | 272 | 4.2 | 0 | 65 | 5.5 |
| Ex. 12 | Epoxy resin | 100 | 408 | 8.7 | 0 | 73 | 7.4 |
| Ex. 13 | Silicone oil | 100 | 140 | 7.5 | 0 | — | 2.1 |
| Ex. 14 | Thermoplastic resin composition | 100 | 140 | 7.5 | 0 | 55 | 1.9 |
| C. Ex. 3 | Epoxy resin | 100 | 0 | — | 117 | — | 1 |
| C. Ex. 4 | Epoxy resin | 100 | 0 | — | 272 | — | 2.5 |
| C. Ex. 5 | Epoxy resin | 100 | 0 | — | 408 | — | 3.9 |
| C. Ex. 6 | Silicone oil | 100 | 0 | — | 140 | — | 0.9 |
| C. Ex. 7 | Thermoplastic resin composition | 100 | 0 | — | 140 | — | 0.7 |

[X1]ratio (volume) of AlN particles except for specific AlN crystal to specific AlN crystal particles
Ex.: Example
C. Ex.: Comparative Example
p.b.w: parts by weight Example 15

Nylon balls having a diameter of 15 mm (surface hardness of not more than 100 kgf/mm$^2$, density of 3.5 g/cm$^3$) whose iron core was coated with nylon were put into a nylon pot having an inner capacity of 2.4 liters, and 95 parts by weight of specific aluminum nitride crystal particles having two opposed hexagonal planes, a ratio (L/D) of the average distance (L) between the planes to the average distance (D) between two opposed corners within the hexagonal plane of 0.23 and a true density of 3.23 g/cm$^3$, 5 parts by weight of small-sized aluminum nitride particles having an average particle diameter of 1.2 μm, a specific surface area of 2.6 m$^2$/g and an oxygen concentration of 0.8 mass %, 5 parts by weight of yttrium oxide powders and 40 parts by weight of ethanol as a solvent were wet mixed together. At this point, the nylon balls filled 40% (apparent volume) of the inner capacity of the pot. Mixing was carried out at a pot revolution of 70 rpm for 3 hours. Further, the obtained slurry was dried to obtain aluminum nitride powders to be sintered.

Then, the obtained mixed powders were sintered under vacuum at a press pressure of 0.4 tf/cm$^2$, a temperature elevation rate of 100° C./min and a sintering temperature of Example 18

The same operation as in Example 15 was carried out except that 70 parts by weight of the specific aluminum nitride crystal particles and 30 parts by weight of the small-sized aluminum nitride particles were used.

Example 19

The same operation as in Example 15 was carried out except that 60 parts by weight of the specific aluminum nitride crystal particles and 40 parts by weight of the small-sized aluminum nitride particles were used.

Example 20

Aluminum nitride powders to be sintered were obtained in the same manner as in Example 15 except that 60 parts of the specific aluminum nitride crystal particles and 40 parts by weight of the small-sized aluminum nitride particles were used. Then, a molded product was obtained by compressing the aluminum nitride powders to be sintered at room temperature and a pressure of about 80 MPa. Thereafter, this molded product was heated at 1,800° C. and normal pressure in a nitrogen gas atmosphere for 5 hours to obtain an aluminum nitride sintered body.

Comparative Example 8

The same operation as in Example 15 was carried out except that 0 part by weight of the specific aluminum nitride crystal particles and 100 parts by weight of the small-sized aluminum nitride particles were used.

Comparative Example 9

The same operation as in Example 15 was carried out except that 100 parts by weight of the specific aluminum nitride crystal particles and 0 part by weight of the small-sized aluminum nitride particles were used.

Comparative Example 10

The same operation as in Example 15 was carried out except that 50 parts by weight of the specific aluminum nitride crystal particles and 50 parts by weight of the small-sized aluminum nitride particles were used.

Comparative Example 11

The same operation as in Example 15 was carried out except that 30 parts by weight of the specific aluminum nitride crystal particles and 70 parts by weight of the small-sized aluminum nitride particles were used.

Comparative Example 12

The same operation as in Example 15 was carried out except that 10 parts by weight of the specific aluminum nitride crystal particles and 90 parts by weight of the small-sized aluminum nitride particles were used.

The production conditions of the aluminum nitride sintered bodies are shown in Table 4, and the characteristic properties of the obtained aluminum nitride sintered bodies are shown in Table 5.

TABLE 4

| | Specific aluminum nitride particles Parts by weight | Small-sized aluminum nitride particles Parts by weight | Sintering method | Heating temperature ° C. | Heating time minutes |
|---|---|---|---|---|---|
| Ex. 15 | 95 | 5 | SPS | 1450 | 10 |
| Ex. 16 | 90 | 10 | SPS | 1450 | 10 |
| Ex. 17 | 80 | 20 | SPS | 1450 | 10 |
| Ex. 18 | 70 | 30 | SPS | 1450 | 10 |
| Ex. 19 | 60 | 40 | SPS | 1450 | 10 |
| Ex. 20 | 60 | 40 | normal pressure | 1800 | 300 |
| C. Ex. 8 | 0 | 100 | SPS | 1450 | 10 |
| C. Ex. 9 | 100 | 0 | SPS | 1450 | 10 |
| C. Ex. 10 | 50 | 50 | SPS | 1450 | 10 |
| C. Ex. 11 | 30 | 70 | SPS | 1450 | 10 |
| C. Ex. 12 | 10 | 90 | SPS | 1450 | 10 |

Ex.: Example,
C. Ex.: Comparative Example

TABLE 5

| | Heat conductivity W/m·K | fracture toughness MPa·m$^{1/2}$ | Vickers hardness GPa | Area occupying ratio % | Orientation ratio % |
|---|---|---|---|---|---|
| Ex. 15 | 161 | 5.5 | 14.6 | 83 | 95 |
| Ex. 16 | 165 | 5.4 | 14.6 | 79 | 93 |
| Ex. 17 | 173 | 5.3 | 14.1 | 72 | 88 |
| Ex. 18 | 179 | 5.3 | 13.5 | 61 | 83 |
| Ex. 19 | 182 | 5.1 | 12.9 | 50 | 78 |
| Ex. 20 | 185 | 5.0 | 12.8 | 53 | 76 |
| C. Ex. 8 | 165 | 2.0 | 9.9 | 0 | 48 |
| C. Ex. 9 | 138 | — | — | 89 | 98 |
| C. Ex. 10 | 145 | 2.8 | 11.2 | 38 | 73 |
| C. Ex. 11 | 169 | 2.4 | 10.4 | 20 | 63 |
| C. Ex. 12 | 170 | 2.1 | 10.0 | 5 | 53 |

Ex.: Example,
C. Ex.: Comparative Example

The invention claimed is:

1. Aluminum nitride single crystal particles, each having a flat octahedral shape in a direction where hexagonal faces are opposed to each other, which is composed of two opposed hexagonal faces and six rectangular faces, wherein
an average distance "D" between two opposed corners within each of the hexagonal faces is 19.1 to 110 μm, a length "L" of the short side of each of the rectangular faces is 2 to 45 μm, and L/D is 0.05 to 0.33; each of the hexagonal faces and each of the rectangular faces cross each other to form a curve without forming a single ridge; and the true density is 3.20 to 3.26 g/cm$^3$.

2. The aluminum nitride single crystal particles according to claim 1, wherein the curve has a distance "t" from a cross line of extension surfaces of each of the hexagonal planes and each of the rectangular faces and the curve satisfies 0<t<0.1 μm.

3. Aluminum nitride powders comprising the aluminum nitride single crystal particles of claim 1.

4. The aluminum nitride powders according to claim 3 which comprises at least 90 vol % of the aluminum nitride single crystal particles.

5. The aluminum nitride powders according to claim 3 which have an average particle diameter of 3 to 110 μm and a specific surface area of 0.01 to 2 m$^2$/g.

6. An organic polymer composition comprising 100 to 600 parts by mass of the aluminum nitride single crystal particles of claim 1 and 100 parts by weight of an organic polymer in which the particles are dispersed.

7. The organic polymer composition according to claim 6 which further comprises aluminum nitride particles other than the aluminum nitride single crystal particles, each having a flat octahedral shape in a direction where hexagonal faces are opposed to each other, which is composed of two opposed hexagonal faces and six rectangular faces, wherein
the average distance "D" between two opposed corners within each of the hexagonal faces is 3 to 110 μm, the length "L" of the short side of each of the rectangular faces is 2 to 45 μm, and L/D is 0.05 to 0.8; each of the hexagonal faces and each of the rectangular faces cross each other to form a curve without forming a single ridge; and the true density is 3.20 to 3.26 g/cm$^3$, in an amount of not more than 20 vol % based on the aluminum nitride crystal particles.

8. The organic polymer composition according to claim 6, wherein the organic polymer is a thermoplastic resin, thermosetting resin or polymer gel.

9. The organic polymer composition according to claim 6, wherein the organic polymer is a liquid.

10. A molded product of the organic polymer composition of claim 6.

11. The molded product according to claim 10, wherein not less than 50% of the aluminum nitride single crystal particles are contained in such a manner that the hexagonal faces of the particles are almost parallel to the surface of the molded product.

12. A sintered body of the aluminum nitride single crystal particles of claim 1, wherein at least part of the hexagonal faces of the aluminum nitride crystal particles is oriented almost in the same direction as the flat plane of the sintered body, and the sintered body has a fracture toughness of not less than 5 MPa·m$^{1/2}$, a heat conductivity of 150 to 230 W/m·k and a Vickers hardness of 11 to 16 GPa.

13. The aluminum nitride sintered body according to claim 12 which is a sintered body of the aluminum nitride single crystal particles and other aluminum nitride particles.

14. The aluminum nitride sintered body according to claim 13, wherein the area occupying ratio of the aluminum nitride single crystal particles is 50 to 90% of the cross section of the sintered body.

15. A process for producing the aluminum nitride single crystal particles of claim 1, comprising reduction nitriding alumina agglomerated particles having an average particle diameter of 5 to 100 µm which are agglomerates of alumina particles having an average particle diameter of 0.1 to 3 µm in the presence of a liquid-phase forming agent in a reaction atmosphere which satisfies the following concentration(s):

(1) a carbon monoxide gas concentration of 20 to 50 vol % and/or (2) a nitrogen gas concentration of 10 to 80 vol %.

16. The process according to claim 15, wherein the carbon monoxide gas concentration is maintained at 20 to 50 vol % by adjusting (1)-1 the supply of a carbon monoxide gas and the supply of a nitrogen gas, (1)-2 the supply of a nitrogen gas or (1)-3 the supply of an inert gas other than the carbon monoxide gas and the nitrogen gas into a reaction atmosphere.

17. The process according to claim 15, wherein the nitrogen gas concentration is maintained at 10 to 80 vol % by adjusting (2)-1 the supply of a carbon monoxide gas and the supply of a nitrogen gas, (2)-2 the supply of a nitrogen gas or (2)-3 the supply of an inert gas other than the carbon monoxide gas and the nitrogen gas into a reaction atmosphere.

18. The process according to claim 15, wherein reduction nitriding is carried out at a reaction temperature of 1,200 to 1,900° C.

19. The process according to claim 15, wherein reduction nitriding is carried out for a reaction time of 3 to 20 hours.

20. A process for manufacturing the sintered body of claim 12, comprising the steps of:

forming a molded product by molding aluminum nitride powders containing 60 to 98 mass % of the aluminum nitride single crystal particles to 40 mass % of aluminum nitride particles having an average particle diameter of 0.5 to 3 µm in such a manner that the hexagonal faces of the aluminum nitride single crystal particles are oriented almost in the same direction as the flat surface of the sintered body; and sintering the molded product.

* * * * *